United States Patent [19]

Early et al.

[11] Patent Number: 4,886,776

[45] Date of Patent: Dec. 12, 1989

[54] METHOD FOR MAKING MIRRORED SURFACES COMPRISING SUPERCONDUCTING MATERIAL

[75] Inventors: James T. Early, Livermore; R. Steven Hargrove, Danville, both of Calif.

[73] Assignee: The United States of America as represented by the United States Department of Energy, Washington, D.C.

[21] Appl. No.: 55,276

[22] Filed: May 29, 1987

[51] Int. Cl.$^4$ .............................................. G02B 27/00
[52] U.S. Cl. ........................................ 505/1; 350/320;
350/610; 350/1.1; 505/776; 252/521; 430/24
[58] Field of Search .................. 350/320, 1.6, 1.1, 1.7, 350/641, 610; 252/521; 430/24

[56] References Cited

U.S. PATENT DOCUMENTS

| | | | |
|---|---|---|---|
| 3,619,235 | 11/1971 | Furuuchi et al. | 350/1.7 |
| 4,022,947 | 5/1977 | Grubb et al. | 350/1.7 |
| 4,160,929 | 7/1979 | Thorington et al. | 350/1.7 |
| 4,337,997 | 7/1982 | Sadoune et al. | 350/641 |
| 4,643,518 | 2/1987 | Taniguchi | 350/1.6 |
| 4,764,003 | 8/1988 | Lake et al. | 350/610 |

OTHER PUBLICATIONS

The Discovery of a Class of High-Temperature Superconductors, by Bednorz et al, in Science, vol. 237, Sep. 4, 1987, pp. 1133–1139.
Japanese Journal of Applied Physics, vol. 26, No. 4, Apr. 1987, pp. L432–L433.

*Primary Examiner*—Bruce Y. Arnold
*Assistant Examiner*—Loha Ben
*Attorney, Agent, or Firm*—Miguel A. Valdes; Roger S. Gaither; Jason R. Hightower

[57] ABSTRACT

Superconducting mirror surfaces are provided by forming a mirror surface from a material which is superconductive at a temperature above about 40° K. and adjusting the temperature of the surface to that temperature at which the material is superconducting. The mirror surfaces are essentially perfect reflectors for electromagnetic radiation with photon energy less than the superconducting band gap.

4 Claims, No Drawings

METHOD FOR MAKING MIRRORED SURFACES COMPRISING SUPERCONDUCTING MATERIAL

The U.S. Government has rights in this invention pursuant to Contract No. W-7405-ENG-48 between the U.S. Department of Energy and the University of California for the operation of the Lawrence Livermore National Laboratory.

FIELD OF THE INVENTION

The present invention is directed to methods for making and using a superconducting mirror. In particular, the superconducting mirror is useful for substantially perfect reflection of radiation of wavelength of less than about 50 microns down to about 200 nanometers.

BACKGROUND OF THE INVENTION

The reflectivity of electromagnetic radiation of long wavelengths, wavelengths longer than about 200 nm, on a conducting surface increases with the conductivity of the material of which the surface is made. It would therefore be expected that a superconducting surface would be essentially perfectly reflective. However, even given a superconducting surface, another limitation to perfect reflectivity is the band gap energy of the reflective surface material. If the band gap of the material is sufficiently low, the impinging electromagnetic radiation would at least in part be absorbed by the surface, rather than reflected. Thus, the low band gap of superconducting materials such as $Nb_3Ge$ limits its use as a mirror to the microwave region. However, readily available nonsuperconducting metals also are extremely reflective of electromagnetic radiation in the microwave region, therefore the use of superconductive materials for reflectivity offered heretofore no substantial advantages.

Recently discovered superconducting materials which are superconducting above about 40° K comprise multiple phases of oxides. See M. K. Wu, et al., Phy. Rev. Let., 58 (9), 908–910 (1987). The present invention is based in part on the discovery that the band gap energy for the multiple phase mixed oxide superconducting materials is greater than that of previously known superconducting materials. Applicants found that these new materials are useful for mirror surfaces for essentially perfect reflection of short wavelengths.

The present invention is further based in part on our recognition of the advantage that the thickness of superconducting mirror surfaces using the multiple phase mixed oxides may be very thin. The thickness of the superconducting mirror surface need only be sufficient to maintain its superconducting properties and surface integrity. This is an advantage over a non-superconducting mirror surface, the thickness of which is governed not only by structural properties required to maintain integrity of the surface, but also by the extent to which electromagnetic radiation penetrates a nonsuperconducting surface. For example, a superconducting metal oxide surface may be penetrated by light to a depth on the order of 100 Angstroms. Thus, very thin coatings of superconducting metal oxides might be used as mirror surfaces, with a thickness at least equal to the depth to which the reflected electromagnetic radiation penetrates the superconductor. Essentially a single thin layer may be placed on a substrate to form the superconducting mirror surface.

SUMMARY OF THE INVENTION

It is an object of the present invention to provide perfectly reflecting mirror surfaces for electromagnetic radiation of wavelengths shorter than previously possible.

Briefly, the present invention provides mirror surfaces characterized by essentially perfect reflection o electromagnetic radiation, of about infrared wavelengths and lower, by forming, either as a layer or bulk material, materials which are superconducting at above a temperature of about 40° K; and adjusting the temperature of the mirror surface to the temperature at which the material is superconducting.

Additional objects, advantages and novel features of the present invention will be set forth in the description that follows and, in part, will be apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Materials utilized for the superconducting mirror surfaces according to the present invention are those materials which are superconducting above about 40° K. These materials are disclosed in publications, such as the Wu, et al. reference, supra, and, in general, include the multiple phase oxides. These superconducting multiple phase systems may particularly include a metal selected from Group IIIB of the Periodic Table (Sc, Y, La) and a metal selected from Group IIA from the Periodic Table (Be, Mg, Ca, Sr, Ba, Ra), along with a transition metal oxide such as CuO. Many of these superconducting materials reach the superconducting state above about 40° K, which enables them to be maintained at least with liquid nitrogen cooling (77° K). Some of these systems may even achieve the superconducting state using conventional Freon-cycle refrigeration.

Methods of preparing these multiple phase superconducting materials are now known in the art and may be performed by those of ordinary skill in the art.

The superconducting materials may be utilized to form a mirror surface as a thin film upon a substrate, or as a bulk material, the former being preferable for the purpose of conserving superconducting material. The mirror surface will be formed by placing a thin layer of the superconducting material over a conventional substrate, such as glass or aluminum. The surface may then be cooled by cooling the substrate by any appropriate means, such as with cooling coils containing liquid nitrogen, Freon or any appropriate liquid which will maintain at least the temperature required to achieve the superconducting state of the mirror materials.

The multiple phase oxide materials have superconducting band gaps significantly greater than that of known metal and metal alloy superconductors. The higher-energy band gap allows these superconducting mirror surfaces to be utilized for essentially perfect reflection of radiation with photon energy less than the superconducting band gap, i.e., far infrared radiation (50–1,000 microns wavelength), infrared radiation (2.5–50 microns), near infrared (0.8–2.5 microns), or even visible light (400–800 nm) with sufficiently high superconducting band gap energy. Depending on the particular band gap, the superconducting mixed phase oxide materials may form essentially perfect reflective surfaces for electromagnetic radiation of even shorter wavelengths.

If the mirror surface is placed as a layer upon a substrate, thickness of the mirrored surface may be quite thin, i.e., approximately 100–1000 Angstroms, provided that the superconducting properties are maintained. However, since the reflectivity of a superconductive surface is essentially perfect, a single layer may suffice to structurally maintain the phases necessary to attain superconductivity at the appropriate temperature.

While one may contemplate many uses of a superconducting mirror surface which essentially perfectly reflects radiation in the infrared wavelength and shorter, particular applications include use as mirrors for focused laser beams having high average power and/or high pulse energy. Essentially no power is lost since essentially no energy is absorbed by the mirrored surface or its substrate.

The mirror surfaces may also be utilized as components in a laser oscillator to attain high extraction efficiency of the energy produced within the laser by reducing or eliminating losses within the laser.

Other applications include use of a mirror for optical systems wherein there is a low loss of the optical quality of the reflected light, as band pass filters, as thermal radiation shields for high temperature ovens, and for any other application wherein high reflectivity of radiation may be required.

The particular advantages of the present invention are that there is an extremely low loss of optical power by reflecting off a superconducting mirror surface, and there is a high optical damage threshold for the mirror surface. Thus, superconducting mirrors will have longer lifetimes due to their resiliency to damage from radiation. Since the superconducting materials can be made superconductive at relatively high temperatures, for example, even as high as that attainable by a Freon refrigeration, the mirrors may be maintained with little or no cooling of the substrate. By use of a thin coating to attain the superconducting properties, an inexpensive substrate may be utilized, thereby further reducing the expense of use of the superconducting mirror. Finally, since a single-layer coating may suffice for the purpose of providing a mirror surface, complex multilayer coatings, often required for nonsuperconducting mirrored surfaces, would not be required. Therefore, it will be apparent that the high reflectivity properties of the superconducting mirrors may be utilized to improve the transmission efficiency of many kinds of optical systems.

The foregoing description of the preferred embodiments of the invention are presented for purposes of illustration and description. It is not intended to be exhaustive nor to limit the invention to the precise form disclosed, and obviously many modifications and variations are possible in light of the above teachings. The embodiments were chosen for description only to best explain the principles of the invention and its practical application thereby enabling others skilled in the art to best utilize the invention and various embodiments, and with various modifications as are suited to the particular use contemplated. It is thus intended that the scope of the invention be defined by the claims appended hereto.

What is claimed is:

1. A method for essentially perfect reflecting electromagnetic radiation of wavelength in the range of about 50 microns to 400 nm comprising the steps of adjusting the temperature of a mirror surface, said surface consisting of a film of a multiple phase metal-metal oxide having superconducting properties at a temperature above about 40° K, to said temperature at which said oxide is superconducting, said surface characterized by an energy band gap greater than the photon energy of the reflected radiation at said adjusted temperature; and directing said electromagnetic radiation to said surface to reflect said radiation from said surface..

2. A method according to claim 1 wherein said surface is characterized by a superconducting band gap greater than the photon energy of the reflected radiation.

3. A method according to claim 1 wherein said multiple phase metal-metal oxide comprises a metal from Group IIIB, a metal from Group IIA, and a transition metal oxide.

4. A method according to claim 3 wherein said transition metal oxide comprises CuO.

* * * * *